(12) United States Patent
Jia et al.

(10) Patent No.: US 8,144,778 B2
(45) Date of Patent: Mar. 27, 2012

(54) MOTION COMPENSATED FRAME RATE CONVERSION SYSTEM AND METHOD

(75) Inventors: Yunwei Jia, Milton (CA); Darryl Lee, Mississauga (CA); Stanley Fok, Mississauga (CA); Gheorghe Berbecel, Toronto (CA)

(73) Assignee: Sigma Designs, Inc., Milpitas, CA (US)

( * ) Notice: Subject to any disclaimer, the term of this patent is extended or adjusted under 35 U.S.C. 154(b) by 1433 days.

(21) Appl. No.: 11/709,665

(22) Filed: Feb. 22, 2007

(65) Prior Publication Data
US 2008/0204592 A1 Aug. 28, 2008

(51) Int. Cl.
H04N 11/02 (2006.01)
(52) U.S. Cl. ............ 375/240.16; 375/240.01; 348/402.1
(58) Field of Classification Search ............... 375/240.1, 375/240.12, 240.15, 240.16; 348/402.1
See application file for complete search history.

(56) References Cited

U.S. PATENT DOCUMENTS

2005/0265451 A1* 12/2005 Shi et al. .................. 375/240.15
2006/0018381 A1* 1/2006 Luo et al. .................. 375/240.16
2007/0230914 A1* 10/2007 Garrido et al. .................. 386/98

OTHER PUBLICATIONS http://www.jvc.com/product.jsp?modelId=MODL027833 &pathId=80&page=1, pp. 1-3.
http://www.micronas.com/products/by_function/frc_94xyh/product_information/index.html, pp. 1-3.
Blanchfield et al., "Advanced Frame Rate Conversion and Performance Evaluation", SMPTE Motion Imaging Journal, Apr. 2006, pp. 153-159.
de Haan, "Invited Paper: Video Format Conversion", Philips Research Laboratories, Eindhoven, The Netherlands, undated, 4 pages.
Hong et al., "66.2: Motion-Interpolated FRC Algorithm for 120Hz LCD", SID 06 Digest, pp. 1892-1895, published in 2006.
Philips Semiconductors Data Sheet, "SAA4998H Field and Line Rate Converter with Noise Reduction and Embedded Memory", Feb. 18, 2004, 38 pages.
http://www.jvc.com/product.jsp?modelId=MODL027833 &pathId=80&page=1, Jan. 13, 2007, pp. 1-3.
http://www.micronas.com/products/by_function/frc_94xyh/product_information/index.html, Mar. 18, 2006, pp. 1-3.
de Haan, "Invited Paper: Video Format Conversion", Philips Research Laboratories, Eindhoven, The Netherlands, 4 pages, Sep. 29, 2003.
Hong et al., "66.2: Motion-Interpolated FRC Algorithm for 120Hz LCD", SID 06 Digest, pp. 1892-1895, Jun. 2006.

* cited by examiner

*Primary Examiner* — Kim Vu
*Assistant Examiner* — Baotran N To
(74) *Attorney, Agent, or Firm* — Jones Day

(57) ABSTRACT

Systems and methods of motion compensated frame rate conversion are described herein. These systems and methods convert an input video sequence at a first frame rate to an output video sequence at a second frame rate through a novel motion estimation and motion vector processing stage that produces a motion field having a plurality of motion vectors that describe the movement of objects between input video frames from the perspective of an interpolated video frame. A subsequent motion compensated interpolation stage then constructs the interpolated video frame using an adaptively blended combination of a motion compensated prediction and a temporal average prediction of the pixel values from the input video frames. Motion estimation in these systems and methods is enhanced by utilizing spatial and temporal biasing on the predictions of moving objects between and within the input frames, and also by removing aberrational motion vectors from the motion field through a hierarchy of motion vector processing blocks.

24 Claims, 9 Drawing Sheets

$$ACT = |x00-x01|+|x01-x02|+|x02-x03|+|x10-x11|+|x11-x12|+|x12-x13|$$
$$+|x20-x21|+|x21-x22|+|x22-x23|+|x30-x31|+|x31-x32|+|x32-x33|$$
$$+|x00-x10|+|x10-x20|+|x20-x30|+|x01-x11|+|x11-x21|+|x21-x31|$$
$$+|x02-x12|+|x12-x22|+|x22-x32|+|x03-x13|+|x03-x23|+|x23-x33|$$

MOTION COMPENSATED FRAME RATE CONVERSION SYSTEM AND METHOD

BACKGROUND

1. Field

The technology described in this patent document relates to the field of video signal processing. More specifically, systems and methods are disclosed for performing motion compensated frame rate conversion of an input video signal at a first frame rate to an output video signal at a second frame rate.

2. Related Art

The picture refresh rates of modern displays (e.g., LCD, PDP, DLP, etc.) range from 50 Hz to 120 Hz, while the picture rates of video sources can be either 50 Hz/60 Hz interlaced, or 24/25/30/48/50/60 Hz progressive, or others. Thus, picture rate conversion is oftentimes necessary to address the disparity between the various source picture rates and the various display rates. For interlaced video sources, such as standard broadcast TV sources, picture rate conversion is normally performed after the de-interlacing function generates a sequence of video frames, and thus the term "frame rate conversion" (FRC) is often used in the literature to describe this conversion process.

A number of FRC methods are known in this field. Among these known methods are three simple linear processing methods: (1) frame repeat, (2) frame drop, and (3) temporal averaging. In the frame repeat method, a video source of 50 frames per second (fps) is converted to 60 fps by simply keeping all the original frames and inserting a repeated frame for every five original frames. In the frame drop method, a video source of 60 fps is converted to 50 fps by dropping every sixth original frame. And in the temporal averaging method a video source of 60 fps is converted to 120 fps by keeping the original frames and generating additional new frames by averaging every two consecutive original frames.

These methods may work well for video sources with static scenes or very slow motion, but for video sources with moderate to fast motion, these methods produce noticeable visual artifacts, such as motion judder and motion blur, especially on large displays. To avoid such artifacts, motion compensated frame rate conversion (MC-FRC) has been proposed and adopted in some commercial products. In MC-FRC, new frames are interpolated from their temporally preceding and following original frames, where the interpolation is along the motion trajectories of the objects in the original frames. MC-FRC has the potential of producing significantly better visual quality than the three aforementioned simple FRC methods.

Although MC-FRC has the potential of producing significantly better visual quality than other FRC methods, a number of challenging issues must be carefully addressed, to realize this potential. First, MC-FRC requires true motion estimation between the original frames in an input video sequence. An incorrect motion description for an object in the sequence may result in the object being put at an incorrect place in the interpolated frame and this may cause noticeable, and undesirable visual artifacts. Second, it is difficult, and even impossible in some cases, to find the true motion for some objects in a video sequence, due to various reasons such as inadequate temporal sampling rate of the video source, noise in the video source, and occlusions where an object may be covered or uncovered from one input frame to the next. Therefore, it is necessary to have a robust fall-back scheme for generating the new frames that does not exhibit noticeable visual artifacts. Third, MC-FRC tends to have high computational and storage complexity. For a cost-efficient solution, the complexity of the MC-FRC method should be constrained.

SUMMARY

Systems and methods of motion compensated frame rate conversion are described herein. These systems and methods convert an input video sequence at a first frame rate to an output video sequence at a second frame rate through a novel motion estimation and motion vector processing stage that produces a motion field having a plurality of motion vectors that describe the movement of objects between input video frames from the perspective of an interpolated video frame. A subsequent motion compensated interpolation stage then constructs the interpolated video frame using an adaptively blended combination of a motion compensated prediction and a temporal average prediction of the pixel values from the input video frames. Motion estimation in these systems and methods is enhanced by utilizing the spatial correlation within a motion field and the temporal correlation between consecutive motion fields, and also by removing aberrational motion vectors from the motion field through a hierarchy of motion vector processing blocks.

An example method of converting an input video sequence at a first frame rate to an output video sequence at a second frame rate may include the steps of: (a) obtaining a current video frame and a previous video frame from the input video sequence; (b) generating a first motion field comprising a first plurality of motion vectors that predict the trajectory of objects moving from the previous video frame to the current video frame; (c) generating a second motion field from the first motion field, the second motion field comprising a second plurality of motion vectors that predict the trajectory of objects moving between the previous video frame and an interpolated video frame and moving between the interpolated video frame and the current video frame; and (d) constructing an interpolated video frame from the pixel data in the current and previous video frames and from the second plurality of motion vectors.

An example method of generating an interpolated video frame between a current frame and a previous frame in an input video sequence may include the steps of: (a) estimating the movement of objects between the previous video frame and the current video frame and generating a motion field comprising a plurality of motion vectors; (b) generating a motion compensated prediction of the pixel value for each object in the interpolated video frame based on the plurality of motion vectors; (c) generating a temporal average prediction of the pixel value for each object in the interpolated video frame based on the pixel values of co-located pixels in the current and previous video frames; and (d) adaptively blending the motion compensated and temporal average predictions to form a final pixel value for the pixels in the interpolated video frame.

An example method of estimating the movement of objects in an input video sequence may include the steps of: (a) obtaining a previous video frame and a current video frame from the input video sequence; (b) generating a first motion field comprising a first plurality of motion vectors that predict the movement of objects from the previous video frame to the current video frame, wherein the first motion field is generated based on a first block size in terms of pixels horizontally and vertically; (c) processing the first motion field by removing motion vectors that are significantly different from neighboring motion vectors in the first motion field and replacing them with motion vectors that are generated from filtering the neighboring motion vectors in the first motion field; (d) generating a second motion field comprising a second plurality of motion vectors that predict the movement of objects from the previous video frame to the current video frame, wherein the second motion field is generated based on a second block size that is smaller than the first block size; and (e) processing the second motion field by removing motion vectors that are significantly different from neighboring motion vectors in the second motion field and replacing them with motion vectors that are generated from filtering the neighboring motion vectors in the second motion field.

An example method of estimating the movement of objects in an input video sequence may include the steps of: (a) obtaining a previous video frame and a current video frame from the input video sequence; (b) partitioning the current video frame into a plurality of blocks; and (c) generating a motion field comprising a plurality of motion vectors that estimate the movement of blocks from the previous video frame to the current video frame. For each of the plurality of blocks in the current video frame, the generating step (c) may include identifying a search area in the previous video frame, and analyzing a plurality of blocks within the search area to select a motion vector that best estimates the movement of the block. The selecting step may be based on a sum of pixel-level absolute differences between the block within the search area and the block in the current video frame, a temporal bias value that represents a temporal correlation between a candidate motion vector within the search area and a previous motion field, and a spatial bias value that represents a spatial correlation between a candidate motion vector within the search range and motion vectors associated with neighboring blocks within the current video frame.

DETAILED DESCRIPTION OF THE DRAWINGS

Figure 1:
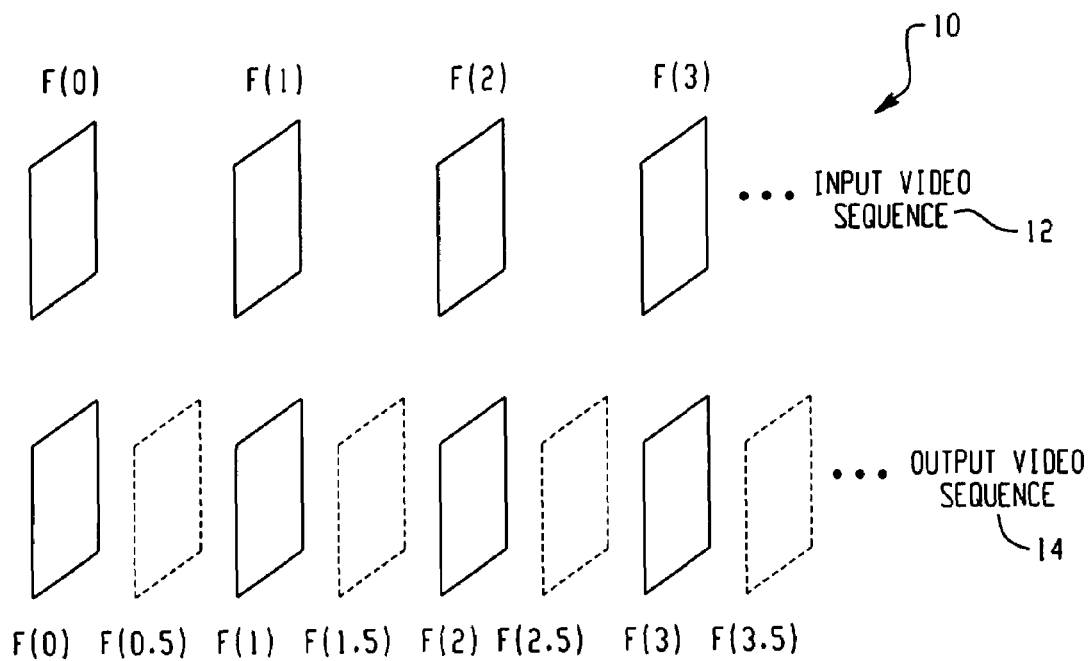
FIG. 1 is a diagram of an input video sequence at a first frame rate and an output video sequence at a second frame rate.

FIG. 1 is a diagram 10 of an input video sequence 12 at a first frame rate and an output video sequence 14 at a second frame rate. The input video sequence 12 is provided to a motion compensated frame rate conversion system, as described in more detail herein, and consists of a number of consecutive frames F(t), each of which has a unique time stamp t, for example, F(0), F(1), F(2) and F(3). The number of frames per second in the input video sequence 12 is referred to as the input frame rate (denoted as $r_{in}$ herein). Output from the frame rate conversion system is a video sequence 14, which consists of a number of frames, some of which may be identical to the frames in the input video sequence 14. These frames are referred to as "original frames", for example, F(0), F(1), F(2) and F(3) within the output video sequence 14. The remaining non-original frames in the output video sequence 14 may bear time stamps that do not appear in the input video sequence, and thus are referred to herein as "new frames," for example, F(0.5), F(1.5), F(2.5), and F(3.5). The number of frames per second in the output video sequence 14 is referred to as the output frame rate (denoted as $r_{out}$ herein). The output frame rate $r_{out}$ is different from the input frame rate $r_{in}$, and the ratio $r_{out}/r_{in}$ may be different depending upon the application to which the frame rate conversion system is applied. The new frames in the output video sequence 14 may be generated by the motion compensated frame rate conversion system by interpolating between the pixel data contained in the original frames on either side of the new frame. Thus, the new frames are also referred to herein as the "interpolated frames."

Figure 2:
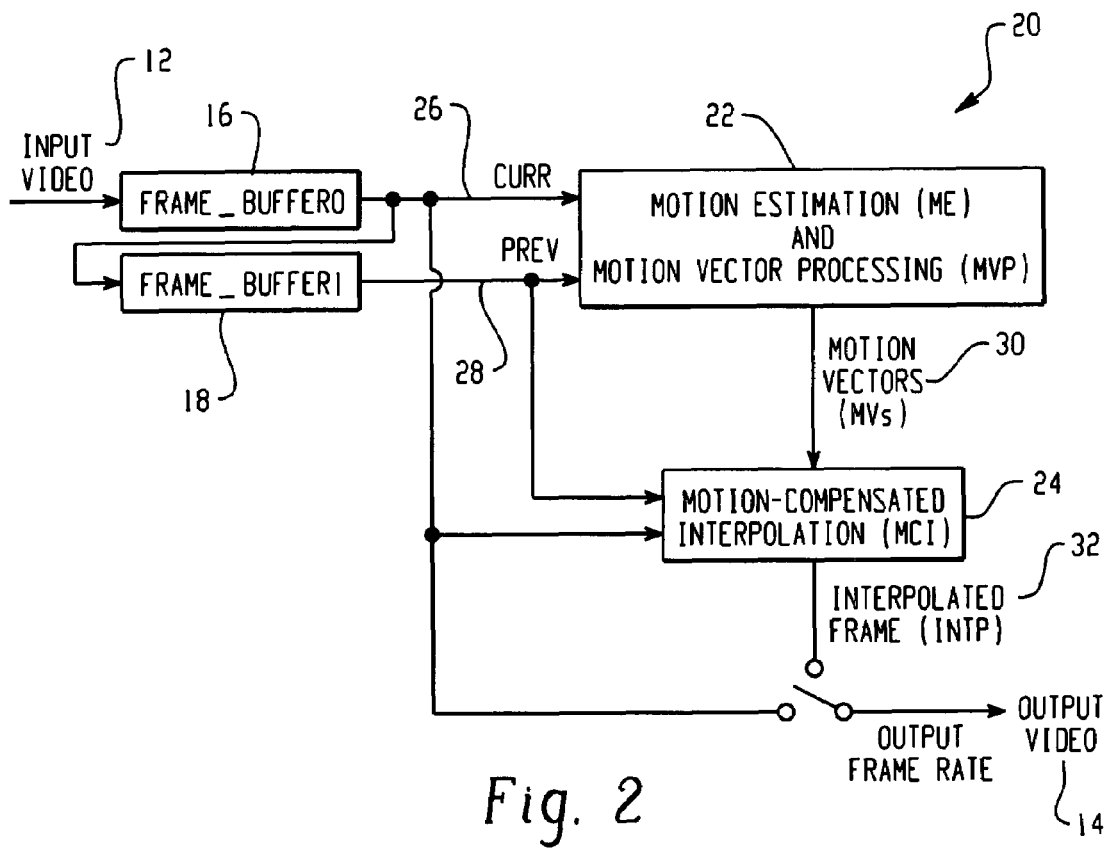
FIG. 2 is a block diagram of an exemplary system for performing motion compensated frame rate conversion.

FIG. 2 is a block diagram of an exemplary system 20 for performing motion compensated frame rate conversion. The system 20 includes a pair of frame buffers 16, 18, a motion estimation (ME) and motion vector processing (MVP) block 22, and a motion compensated interpolation (MCI) block 24. Operationally, the two frame buffers 16, 18, labeled FRAME_BUFFER0 and FRAME_BUFFER1, receive the input video signal 12 and are used in a "ping-pong" fashion to sequentially store a current frame ("CURR") 26 and a previous frame ("PREV") 28. The current and previous frames 26, 28 are provided to the ME/MVP block 22 and the MCI block 24. The current frame is also provided as one input to the video switch that couples to the output video sequence 14.

Motion estimation is performed by block 22 between the CURR and PREV video frames, resulting in a motion field 30 comprising a plurality of motion vectors that describe the movement of objects between the CURR and PREV video frames. Preferably, as discussed in more detail below, this motion field 30 is constructed from the perspective of an interpolated video frame 32 between the CURR 26 and PREV 28. In addition to motion estimation, motion vector processing is applied to the calculated motion vectors within the ME/MVP block 22 in order to improve their reliability. The processed motion vectors 30, together with the two original frames PREV 28 and CURR 26, are provided to the MCI block 24, which then generates the interpolated frame ("INTP") 32. At the output, either the interpolated frame INTP 32 or the incoming frame CURR 26 is then selected at the output frame rate $r_{out}$ to form the output video sequence 14.

Figure 3:
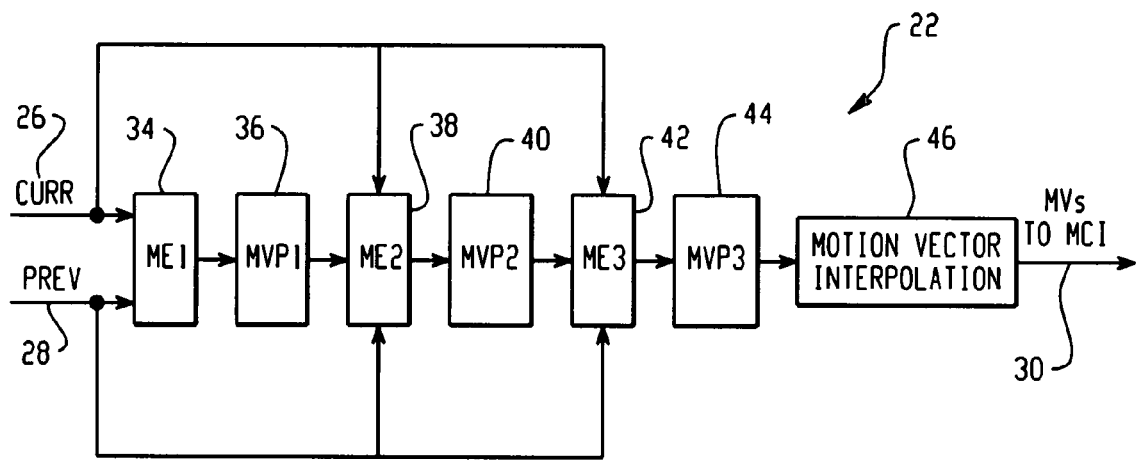
FIG. 3 is a block diagram of an exemplary motion estimation and motion vector processing stage.

FIG. 3 is a block diagram of an exemplary motion estimation and motion vector processing stage (ME/MVP) 22. This stage 22 may include three motion estimation sub-stages ME1 34, ME2 38 and ME3 42, three interleaved motion vector processing sub-stages MVP1 36, MVP2 40, and MVP3 44, and a motion vector interpolation stage 46.

The inputs to the ME/MVP block 22 are the two original frames PREV 28 and CURR 26. In order to reduce the complexity of this block, only the luminance samples of PREV and CURR may be used, although alternatively the chrominance samples may also be used for potentially better motion estimation performance. The outputs of this block are the motion vectors 30 that are used in the motion-compensated interpolation stage 24.

A hierarchical block-matching method may be used in motion estimation, with the three ME stages (ME1, ME2, and ME3 in FIG. 3). A motion vector processing stage (MVP1, or MVP2, or MVP3 in FIG. 3) may follow each of the ME stages in order to improve the reliabilities of the obtained motion vectors from each of the motion estimation stages. The final stage "motion vector interpolation" 46 may be used to interpolate the motion field obtained from MVP3 44 to generate a set of motion vectors, one for each N×M block in the frame INTP, where N and M are the height and the width, respectively, of each block in terms of pixels.

Figure 4:
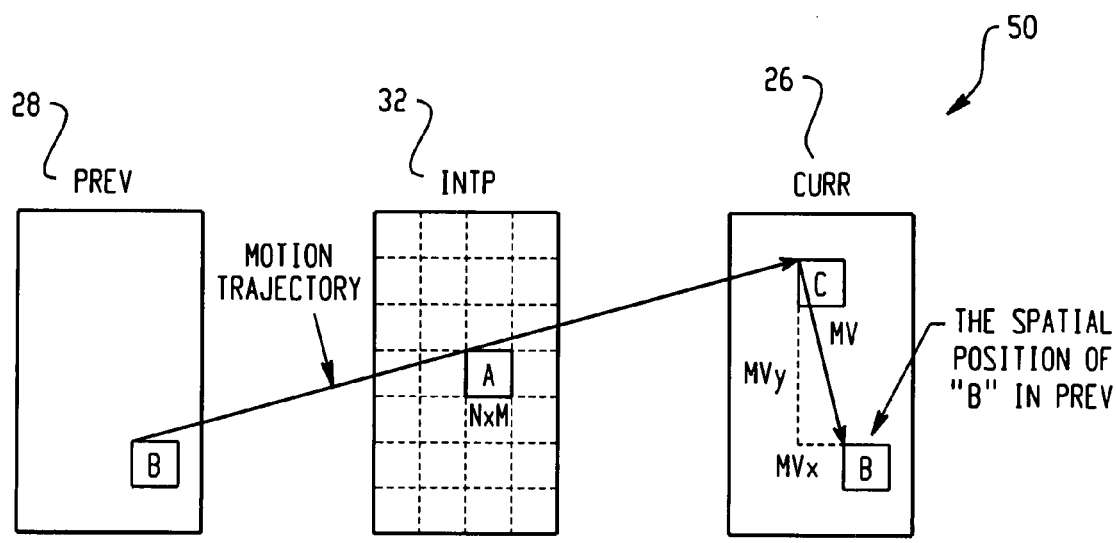
FIG. 4 is a motion trajectory diagram depicting an example motion vector calculation for a block in an interpolated video frame.

FIG. 4 is a motion trajectory diagram 50 depicting an example motion vector calculation for a block in an interpolated video frame 32. Illustrated in FIG. 4 is an N×M block "A" in the to-be interpolated frame INTP 32 and its associated motion vector MV. An N×M block "B" in the PREV frame 28 follows a motion trajectory that passes through the top-left pixel position of "A" in INTP 32 and reaches the position "C" in the CURR frame 26. Throughout this document, the top-left pixel of a given block is used to specify its position. The motion vector of "A" is then represented by the horizontal offset MVx and vertical offset MVy from the position "C" to the position of "B", i.e., MV=(MVx, MVy). The motion vectors generated from ME/MVP 22 may be of integer-pel precision, in which case MVx and MVy have the same precision as the pixel's coordinates, or may be of sub-pel precision, in which case MVx and MVy will have a precision that is higher than the pixel's coordinate.

Figure 5:
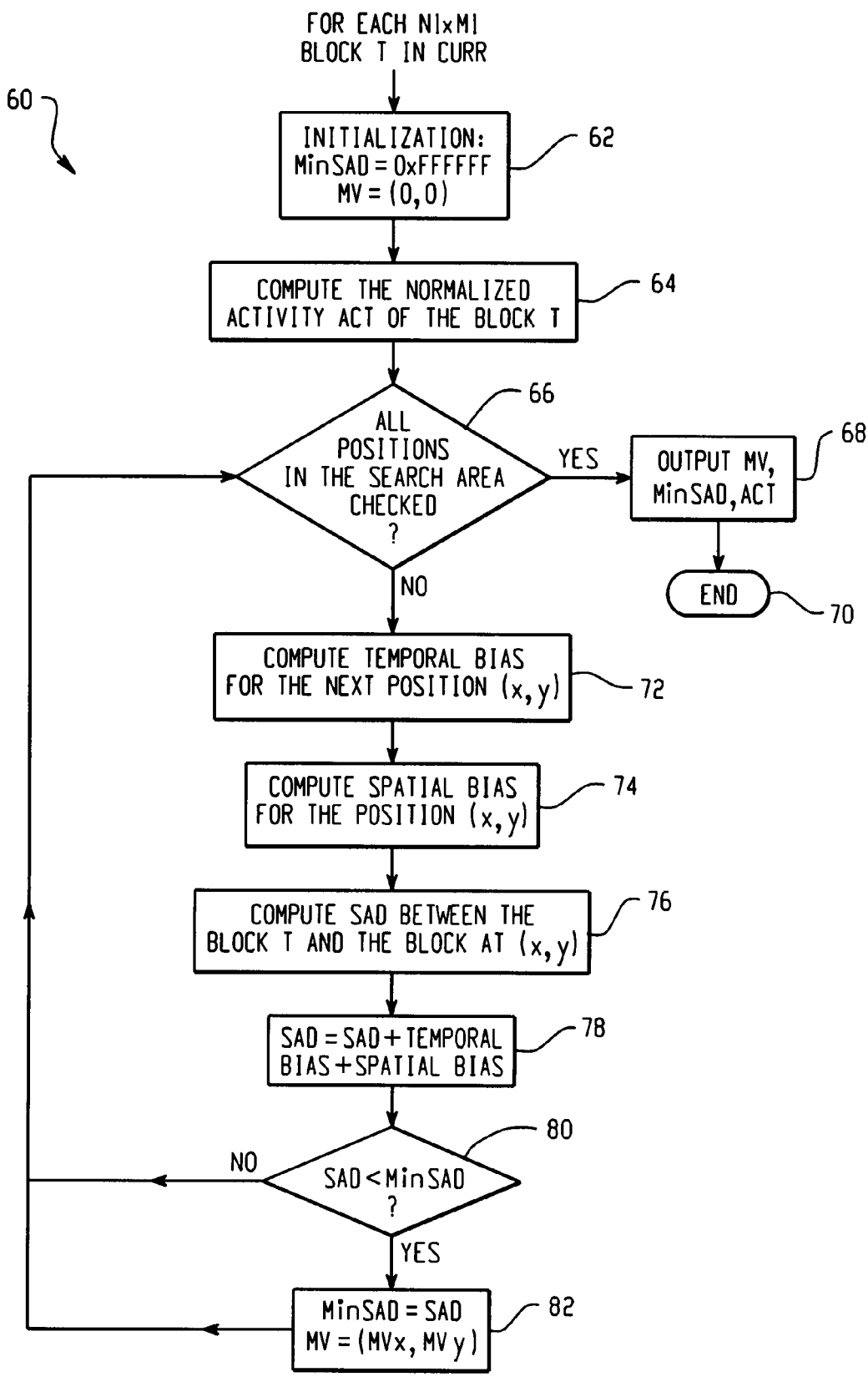
FIG. 5 is an example flowchart of a method for performing motion estimation between two input video frames.

FIG. 5 is an example flowchart 60 of a method for performing motion estimation between two input video frames. This method is implemented in block ME1 34 of the ME/MVP stage 22. In ME1 34, a full-search block-matching motion estimation process may be performed according to FIG. 5 between the input video frames CURR 26 and PREV 28, with the block size being N1×M1 pixels where N1 and M1 are respectively the height and the width of each block in terms of pixels. Note that the block size in ME1 (i.e., N1×M1) may be different from and normally larger than the block size N×M, which is the block size for the motion vectors 30 output from the ME/MVP stage 22.

Initially, the input frame CURR 26 is partitioned into non-overlapping blocks of size N1×M1. The steps 62-82 of FIG. 5 are then performed for each of the blocks in CURR 26. Beginning at step 62, for a given N1×M1 block T, a variable MinSAD ("Minimum SAD", where SAD stands for Sum of Absolute Differences) is first initialized to a very large number (for example, 0xFFFFFF) and its motion vector MV is initialized to (0, 0). The normalized activity ("ACT") of the block T is then calculated at step 64. The activity of a block may be defined as the summation of the absolute differences between the neighboring pixels in T, both horizontally and vertically, as exemplified in FIG. 6 using a 4×4 block.

Figure 6:
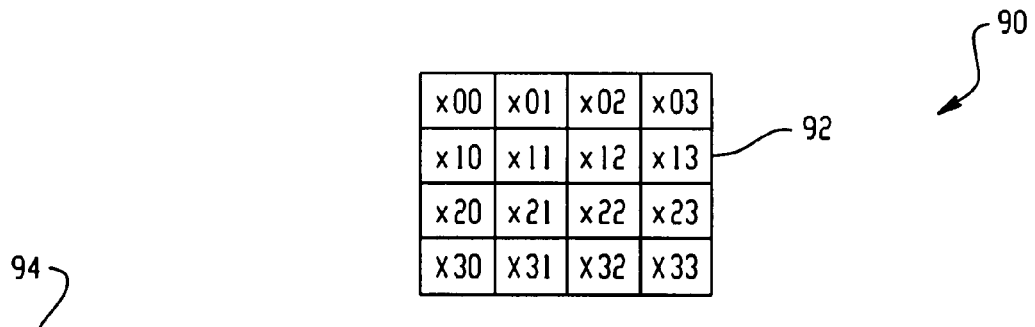
FIG. 6 is a diagram of an example activity calculation for a block in an input video frame.

FIG. 6 is a diagram of an example activity calculation 94 for a block 92 in an input video frame. A more general meaning of the activity of a block is the spatial signal correlation, or the high frequency component of the signal representing the block being processed. ACT may be normalized against the number of pixels in the block. For example, for the 4×4 block in FIG. 6, the normalization may be accomplished by ACT=ACT*16/20, where 16 is the number of pixels in the block, and 20 is the number of absolute pixel differences in the activity calculation.

Turning back to FIG. 5, to limit the computational complexity of ME1 34, a motion search 66 is then performed only in a certain area of PREV 28 in order to identify the best-matching block in PREV 28 to the block T of CURR 26. In doing so, each position in the search area of PREV 28 corresponds to a candidate motion vector for the block T. If the block T is located at the position (x, y) of CURR 26, then the center of the search area in PREV 28 may be set to (x, y), which corresponds to the motion vector (0, 0). The criteria for determining the "best-matching" block in PREV 28 may include three parts: (1) the temporal correlation between a candidate motion vector and the previous motion field (i.e., the motion vectors between the frame PREV 28 and its preceding frame, called PREV_MINUS_1 herein); (2) the spatial correlation between the candidate motion vector and its neighboring motion vectors in CURR 26; and (3) the weighted sum of absolute pixel differences between the block T in CURR 26 and the candidate block in PREV 28.

Assuming that all of the search positions within PREV 28 have not been checked, then control of the method passes from step 66 to step 72. In step 72, for the candidate motion vector for the block T in relation to the current search position, a temporal bias value is calculated which represents a temporal correlation between the candidate motion vector and the previous motion field. Then, in step 74, a spatial bias value is calculated which represents a spatial correlation between the candidate motion vector and any neighboring motion vectors of the block T that have been calculated. In step 76, a value "SAD" is calculated, which represents the sum of absolute pixel differences between the block T in CURR 26 and the block in PREV 28 pointed to by the candidate motion vector. The SAD calculation is then "biased" in step 78 by the temporal bias and spatial bias calculations from steps 72 and 74 to reflect the reliability and/or probability that the candidate motion vector is an accurate depiction of the true motion of the block T from PREV to CURR. These bias calculations are described in more detail below with reference to FIGS. 7-9.

The SAD calculation between the block T and the candidate block (V) may be calculated from all the pixel-pairs in T and V. Alternatively, the SAD may be calculated from some of the pixel-pairs in T and V for the purpose of reducing computational complexity. Or the SAD may be calculated from a filtered version of T and a filtered version of V, for the possible purpose of reducing computational complexity and/or noise resilience. Or the SAD calculation may include some of the neighboring pixels of T and V, for the possible purpose of increasing motion field smoothness. Or the SAD calculation may be calculated as a weighted sum of absolute differences of the co-located pixels in the two blocks, where the weights may be fixed, or may depend on the distance from a pixel to the origin of the block, or may be adaptive to the spatial frequency component in the neighborhood of each pixel in the block.

If the SAD calculation from step 78 is less than the MinSAD value, as tested at step 80, then the new MinSAD value is set to SAD, and the candidate motion vector becomes the current motion vector for this block as shown at step 82. Control then passes back to step 66 to check the next search position within PREV 28. If the SAD calculation from step 78 is not less than the current MinSAD value, meaning that this is not the best matching search position in PREV tested so far, then the motion vector is not updated in step 82, and control reverts to step 66 to continue checking for additional search positions within PREV 28. After all of the search positions have been checked, the method outputs the motion vector MV (MVx, MVy), the MinSAD value, and the activity value ACT for the best-matching block in PREV 28 to the block T under analysis. This process 60 is repeated for each block T in CURR 26 in order to complete the motion field output from the first motion estimation sub-block ME1 34.

Figure 7:
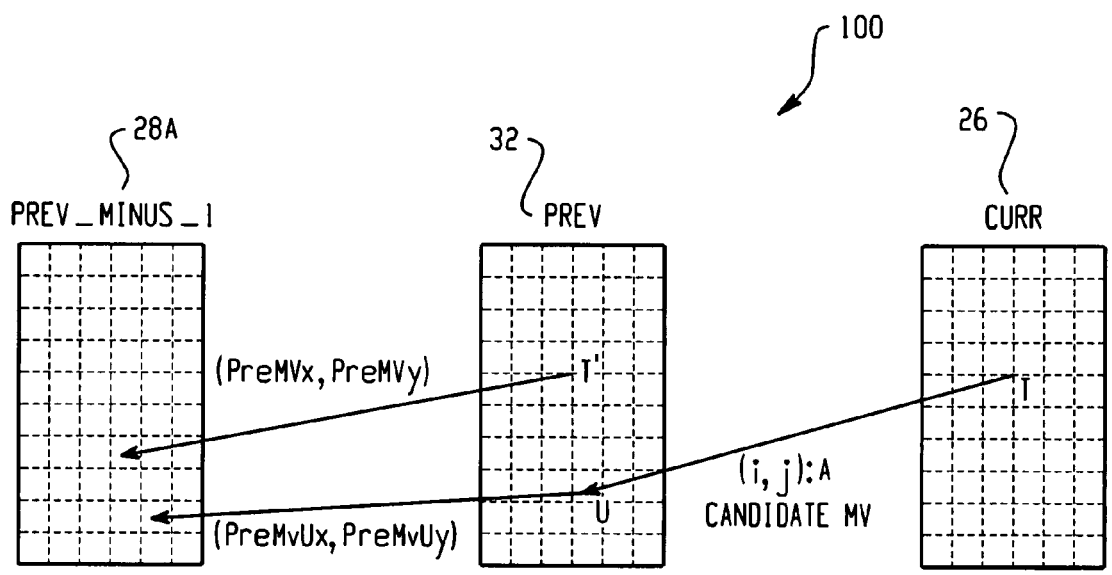
FIG. 7 is a motion trajectory diagram depicting an example temporal bias calculation for a candidate motion vector.

FIG. 7 is a motion trajectory diagram 100 depicting an example temporal bias calculation for a candidate motion vector. For a candidate motion vector (i, j) for the block T in CURR 26, its temporal bias may be calculated in the following way. Let the normalized activity of the block T be ACT. Let T' be the block at the position (x, y) in the PREV frame 28, i.e., T and T' are co-located. In the motion field between PREV and PREV_MINUS_1, 28A, which is the frame prior to PREV 28, let (PreMVx, PreMVy) be the motion vector (as output from block MVP1 36) for the block T'. Now, Let td be a variable that represents a measurement of the difference between the candidate motion vector (i, j) and the prior motion vector (PreMVx, PreMVy). For example, td may be calculated as: td=|i−PreMVx|+|j−PreMVy|. Then, the bias for the candidate motion vector (i, j) may be calculated as: temporal_bias=min (ACT, td*ACT/16).

Alternatively, the temporal bias may be calculated in the following way. Let U be the N1×M1 block in PREV 28 which is pointed to by the candidate motion vector (i, j). Let (PreMvUx, PreMvUy) be the motion vector of U in the motion field between PREV 28 and PREV_MINUS_1. In the event that (PreMvUx, PreMvUy) does not exist in the prior motion field, for example due to the possibility that block U may not be aligned with N1×M1 grids of PREV, then it is possible to approximate it by spatially interpolating the available motion vectors in the neighborhood of U. The variable td may then be calculated as: td=|i−PreMvUx|+|j−PreMvUy|, and the temporal_bias may be calculated in the same way as described above.

Figure 8:
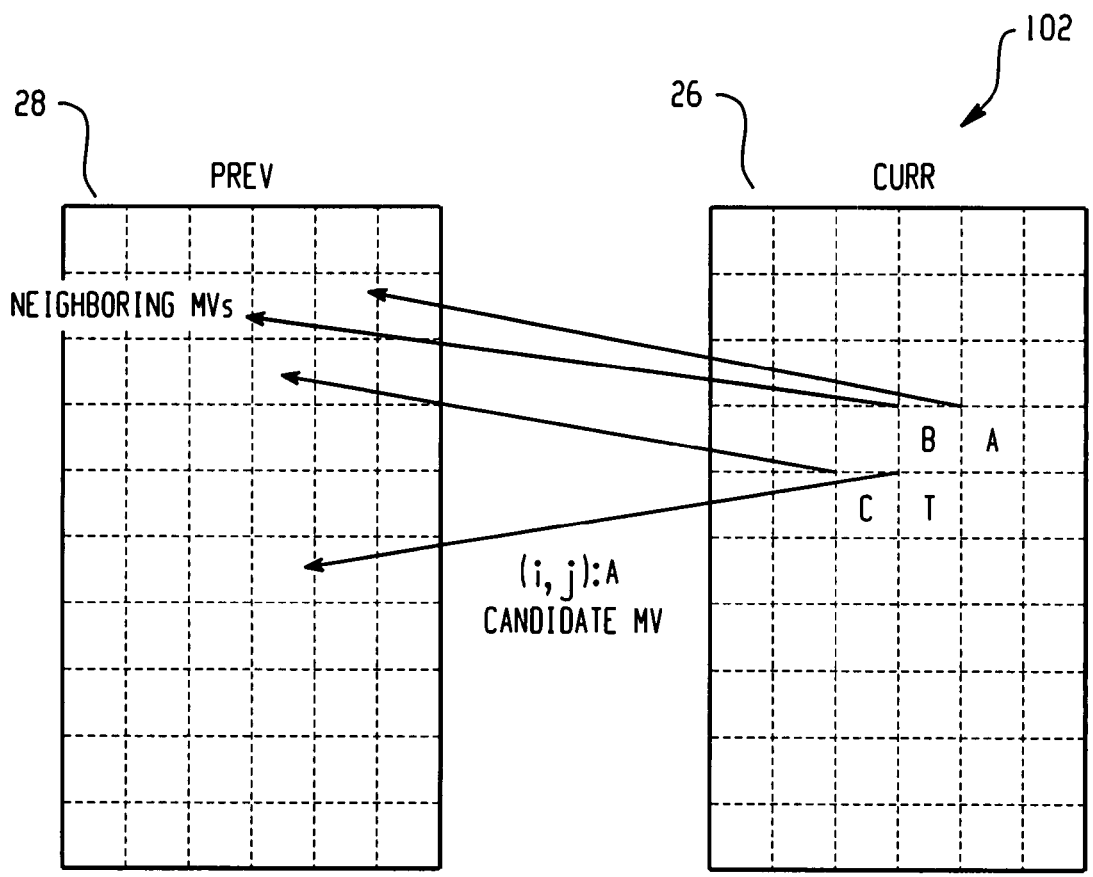
FIG. 8 is a motion trajectory diagram depicting an example spatial bias calculation for a candidate motion vector.

FIG. 8 is a motion trajectory diagram 102 depicting an example spatial bias calculation for a candidate motion vector. For a candidate motion vector (i, j) of the block T in CURR 26, its spatial bias may be calculated in the following way. During the process of ME1 for the block T, consider the available motion vectors of the neighboring blocks of the block T in CURR 26, for example, blocks A, B, and C. Then, denote the median of the neighboring motion vectors as (MVMx, MVMy). This median calculation may be made according to the technique described below in reference to FIG. 9, for example. Now, let sd be a variable that represents a measurement of the difference between the candidate motion vector (i, j) and the median of the neighboring motion vectors (MVMx, MVMy). For example, sd may be calculated as: sd=|i−MVMx|+|j−MVMy|. Then, the spatial bias for the candidate motion vector (i, j) may be calculated as: spatial_bias=min (ACT/2, sd*ACT/32).

Figure 9:
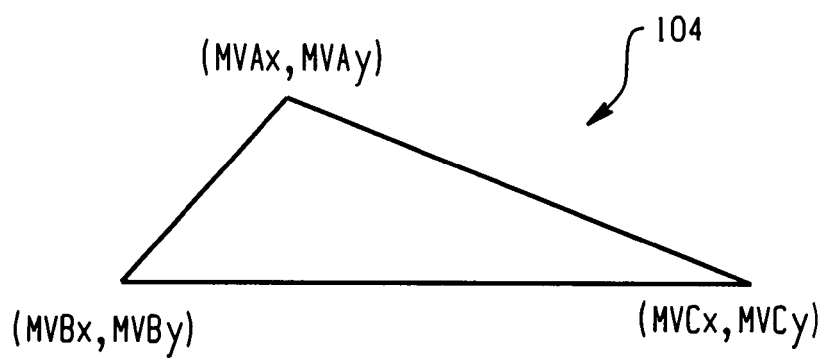
FIG. 9 is a diagram depicting a 2D median calculation of three motion vectors.

FIG. 9 is a diagram 104 depicting a 2D median calculation of three motion vectors. The median of a number (greater than 2) of motion vectors may be calculated separately for their horizontal offsets and vertical offsets, following the conventional definition of median. Alternatively, the median of a set of motion vectors may be calculated in 2D space, as exemplified in FIG. 9 using three motion vectors. Let the motion vectors for the three neighboring blocks A, B, and C be (MVAx, MVAy), (MVBx, MVBy), and (MVCx, MVCy), respectively. Consider the three motion vectors as the three vertices of a triangle in a 2D space. For each vertex, the sum of the lengths of all the edges that are connected to it is computed. Note that the length of an edge between two vertices may be computed as the Euclidean distance between the two vertices or alternatively it may be approximated by the sum of the horizontal offset and the vertical offset between the two vertices. The vertex with the least sum is the median of the three motion vectors. Alternatively, the neighboring blocks of the block T may be examined by choosing the blocks among them that are similar to block T, and then the chosen blocks are used to determine the median motion vector. The similarity between two blocks may be measured in terms of their block activities, i.e., a neighboring block is similar to the block T if its block activity is close to that of T. In another possible implementation, the 2D median processing of an arbitrary number of motion vectors may be done by taking into consideration the likelihood of every motion vector. The process of filtering may be applied separately on horizontal and vertical components or simultaneously on both components, and may be in either linear or non-linear fashion by employing for each motion vector the weight that is proportional to the likelihood of that motion vector.

The motion vectors obtained from ME1 34 through the process of FIGS. 5-9 may then proceed through a motion vector processing stage MVP1 36, which is used to increase the reliability of the motion vectors from ME1 34. In so doing, the motion vector processing stage 36 identifies any motion vectors that are statistically abnormal or aberrational in comparison to neighboring motion vectors and eliminates these abnormalities. For example, for each N1×M1 block T in CURR 26, let A, B, C, and D be its four neighboring blocks, and MV1_A, MV1_B, MV1_C, and MV1_D be the corresponding motion vectors obtained from ME1 34. If any of the neighboring blocks is not available, its motion vector may be replaced by the motion vector of the block T. Let MV1P_T be the motion vector of T after processing by MVP1 36. MV1P_T may then be calculated as the 2D median of the five motion vectors MV1_A, MV1_B, MV1_C, MV1_D, and MV1_T, as described previously. In doing so, abnormal motion vectors may be replaced by the 2D median of the five motion vectors, thereby smoothing out or eliminating any statistically disparate motion vectors and improving the reliability of the motion trajectory predictions from frame to frame.

Figure 10:
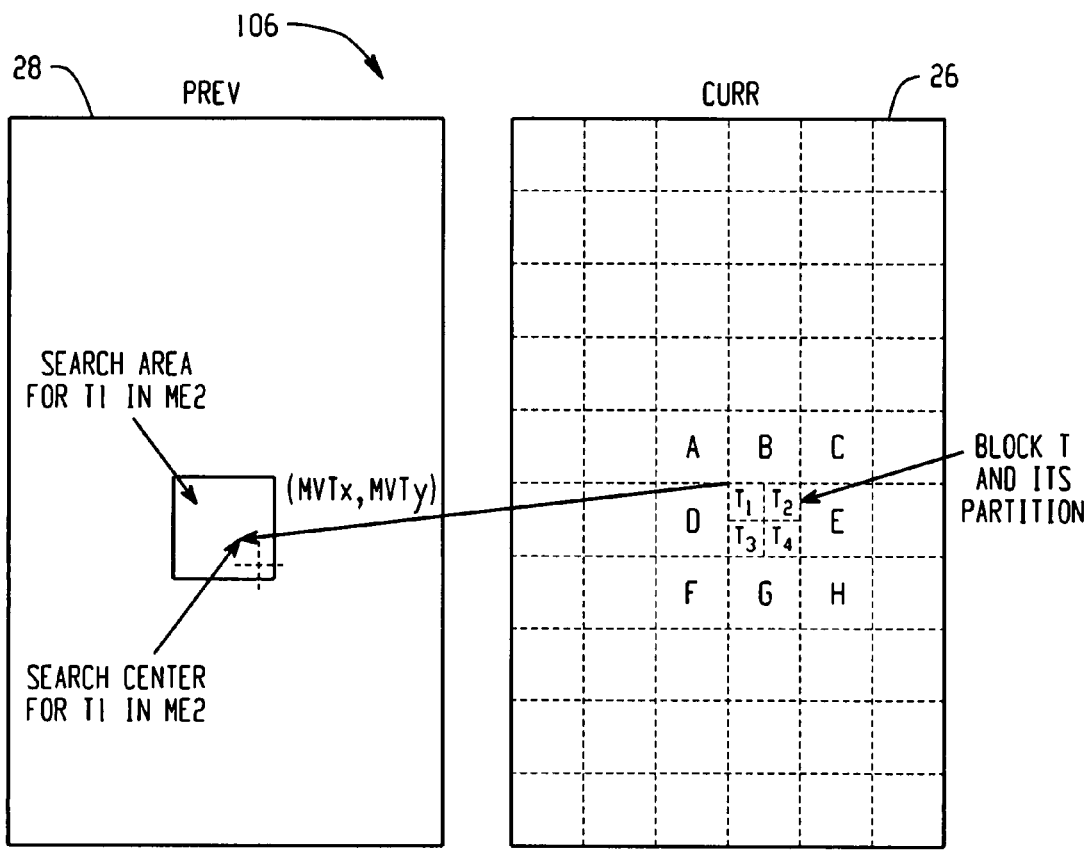
FIG. 10 is a motion trajectory diagram depicting an example motion vector calculation for a sub-block in an input video frame.

FIG. 10 is a motion trajectory diagram depicting an example motion vector calculation for a sub-block in an input video frame. This diagram 106 corresponds to the second stage of motion estimation in FIG. 3, referred to as ME2 38. The motion vectors obtained from MVP1 36 are provided to ME2 38, in which each N1×M1 block T of CURR 26 may be further partitioned into non-overlapping sub blocks of size N2×M2, in which N2 and M2 are preferably smaller than N1 and M1. As shown in FIG. 10, for example, assume that each block T in CURR 26 is a 4×4 pixel block, then N2 and M2 would each be 2 pixels, so that there are four sub-blocks T1, T2, T3 and T4 within the original block T.

Within ME2 38, a new motion field is then calculated but now the motion vectors are calculated for each of the smaller N2×M2 blocks. In so doing, a block-based full search method may be used in ME2, and calculations of candidate motion vectors can be made for each of the smaller blocks using the same methodology as described with reference to FIG. 5. The search area, however, can be limited to a smaller area pointed to by the motion vector for the larger block T to which the sub-blocks belong. For example, let the motion vector from MVP1 for the N1×M1 block T be (MVTx, MVTy). Let T1 be an N2×M2 block from partitioning the block T and at the position (u, v). The search area in PREV 28 used by ME2 38 for the block T1 may be centered at the position pointed to by the motion vector (MVTx, MVTy), i.e., (u+MVTx, v+MVTy). Alternatively, the search area of the block T1 in ME2 may be centered at the position pointed to by the median motion vector of the neighboring blocks. As an example, the median motion vector for determining the search center for T1 may be calculated from the motion vectors of the blocks A, B, D, and T, and the median motion vector for determining the search center for T2 may be calculated from the motion vectors of the blocks B, C, E, and T, and so on.

The motion vectors obtained from ME2 38 may then be processed by another motion vector processing stage MVP2 40. MVP2 40 may include the same process as initial motion vector processing stage MVP1 36, except that the input and output of MVP2 are motion vectors for blocks with size N2×M2, where N2 and M2 are respectively the height and the width of each block in terms of pixels.

The processed motion vectors obtained from MVP2 40 may then go through a further motion estimation process ME3 42. The primary purpose of this motion estimation stage 42 is to compute a motion field from the perspective of the to-be interpolated frame (INTP) 32. The motion vectors obtained from MVP2 40 represent the motion between the frames PREV 28 and CURR 26, with each motion vector connecting an N2×M2 block in CURR 26 (aligned with the N2×M2 grids in CURR 26) and an N2×M2 block in PREV 28 (not necessarily aligned with the N2×M2 grids in PREV 28). Thus, the motion field from MVP2 40 is from the perspective of the CURR 26 block. In order to properly generate the frame INTP 32, however, the motion vectors that represent object motion between PREV 28 and INTP 32, and between INTP 32 and CURR 26 are needed. More specifically, for each N2×M2 block in INTP 32 (aligned with the N2×M2 grids in INTP 32), a motion vector that connects an N2×M2 block in PREV 28 (not necessarily aligned with the N2×M2 grids in PREV 28) and an N2×M2 block in CURR 26 (not necessarily aligned with the N2×M2 grids in CURR 26) and passes through the N2×M2 block in INTP 32 is needed. This process of generating the motion field from the perspective of INTP 32 is performed by ME3 42, as further illustrated and described with respect to FIG. 11.

Figure 11:
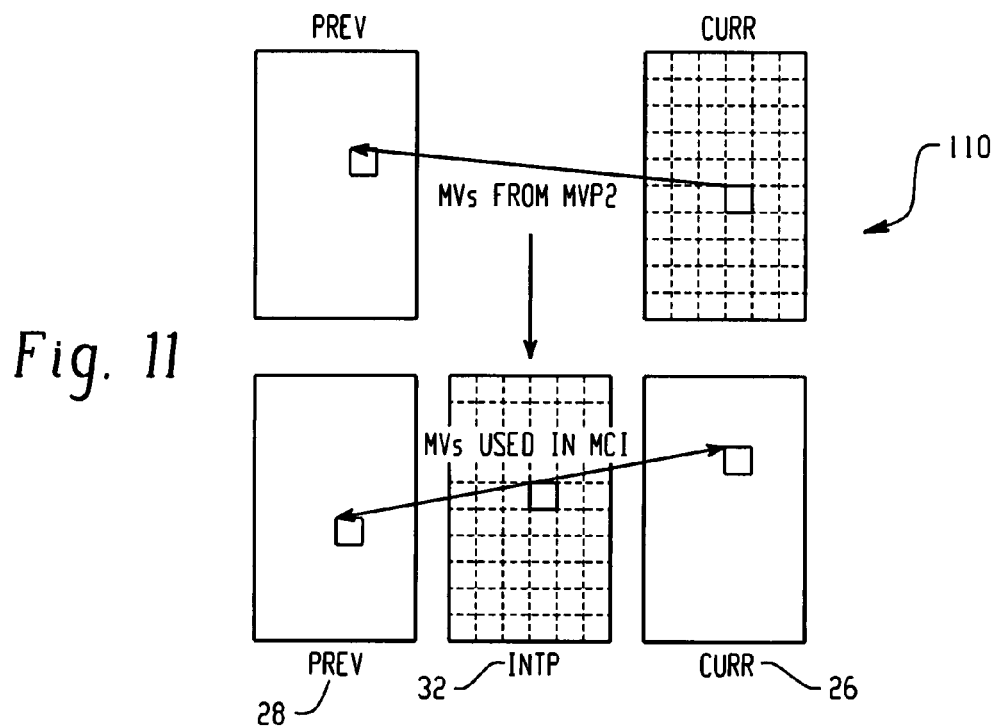
FIG. 11 is a motion trajectory diagram depicting the difference between a motion field from the perspective of an input video frame and a motion field from the perspective of an interpolated video frame.

FIG. 11 is a motion trajectory diagram 110 depicting the difference between a motion field from the perspective of an input video frame 26 and a motion field from the perspective of an interpolated video frame 32. This motion field, from the perspective of the interpolated video frame 32, may be constructed as follows. Let the time stamps for PREV 28, INTP 32, and CURR 26 be t1, t1+τ, and t2, respectively. Let S be an N2×M2 block at the position (x0, y0) in INTP 32. The block S is aligned with the N2×M2 grids of INTP 32. In the motion field obtained from MVP2 40, the ME3 stage 42 will search in the neighborhood of the position (x0, y0) for a best-matching motion vector for the block S in INTP 32, as shown in FIG. 12.

Figure 12:
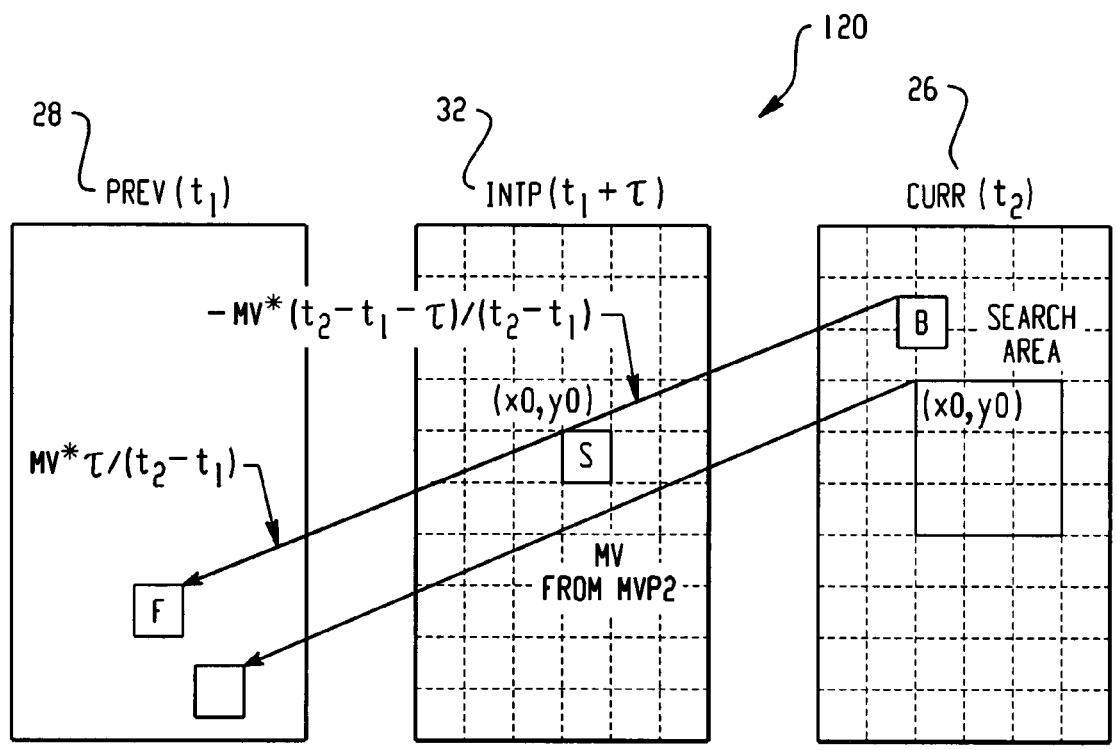
FIG. 12 is a motion trajectory diagram depicting the process of generating a motion field from the perspective of an interpolated video frame.

FIG. 12 is a motion trajectory diagram depicting the process of generating a motion field from the perspective of an interpolated video frame 32. As shown in this figure, a neighborhood of the position (x0, y0) which consists of a number of N2×M2 blocks is selected, each of the blocks having a motion vector from MVP2 40. For each of these motion vectors, MV, the ME3 stage will apply it to the block S in INTP and form two motion-compensated predictions: (a) a first prediction (the block "F" in PREV 28) from the frame PREV 28 with the motion vector $MV*τ/(t2-t1)$; and the second prediction (the block "B" in CURR 26) from the frame CURR 26 with the motion vector $—MV*(t2-t1-τ)/(t2-t1)$. Then, the SAD between these two motion-compensated predictions can be calculated, and the motion vector that yields the minimal SAD among all of the candidate motion vectors may be assigned to the block S by ME3 42. In addition, temporal bias and spatial bias may be applied to the SAD calculations in the same manner as shown and described with reference to FIGS. 5-9 in order to increase the reliability of the selected motion vectors.

The motion vectors obtained from ME3 42 may then go through another motion vector processing stage MVP3 44. MVP3 44 may be the same as the process MVP1 36, except that the input and output for MVP3 44 are motion vectors for blocks with size N2×M2, and which are originated from the blocks in INTP 32.

Subsequently, the motion vectors from MVP3 44 may go through a process referred to as "motion vector interpolation" 46. In this process, the to-be interpolated frame INTP 32 is partitioned into non-overlapping blocks of size N×M which is normally smaller than N2×M2, and a motion vector is generated for each of these blocks, according to several example processes. For example, the motion vector for an N×M block Q in INTP 32 may be set to be the same as the motion vector of the N2×M2 block P from MVP3 44, where the block Q is part of the block P. Or the motion vector for the block Q may be obtained through spatial interpolation of the motion field near the block P, where the motion field is obtained from MVP3 44. Or the motion vector for the block Q may be obtained through the previously described 2D median filtering of the motion vectors in the neighborhood of the block Q. Or a pixel level motion vector may be derived from the block level motion vectors, through a process of 2-dimensional polyphase filtering and interpolation. As a result of pixel level interpolation for the motion vectors, the smoothness of the output image may be increased.

Figure 13:
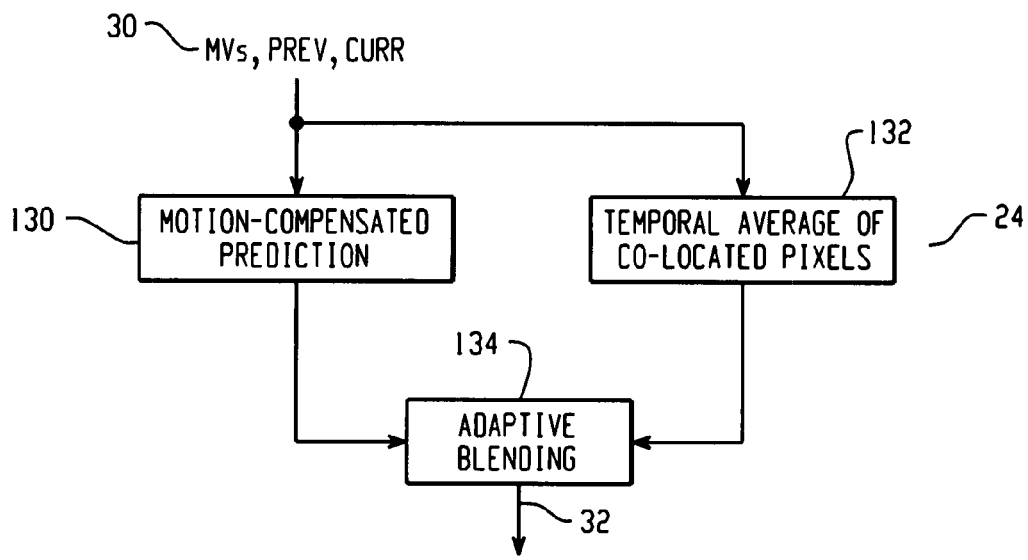
FIG. 13 is a block diagram of an exemplary motion compensated interpolation stage.

FIG. 13 is a block diagram of an exemplary motion compensated interpolation (MCI) stage 24. This stage 24 receives the motion vectors from the ME/MVP stage 20, which are the motion vectors from the perspective of the to-be interpolated frame 32, and the two original frames, PREV 28 and CURR 26. The output of this stage 24 is the interpolated video frame 32. The MCI stage includes a motion-compensated prediction block 130, a temporal averaging block 132, and adaptive blending block 134.

Generation of the interpolated video frame 32 in the MCI stage 24 may proceed as follows. For each N×M block P in INTP 32, a forward motion-compensated prediction and a backward motion-compensated prediction are constructed from PREV 28 and CURR 26 by the motion-compensated block 130, using the generated motion vectors 30. An average of the pixel values pointed to by these two predictions may then be formed and called "MC average." In addition, a temporal average of the two co-located blocks of P in CURR 26 and PREV 28 may be generated and called "co-located average," where co-located average is the average of the pixel values located at the two co-locations in CURR 26 and PREV 28. The MC average and co-average values may then be adaptively blended 134 to form the final pixel value in INTP 32 using a blending factor, where the blending factor depends on the quality of the match between the two motion-compensated predictions and between the co-located pixels in PREV 28 and CURR 26. An example of these averaging and blending calculations is described below with reference to FIGS. 14-17.

Figure 14:
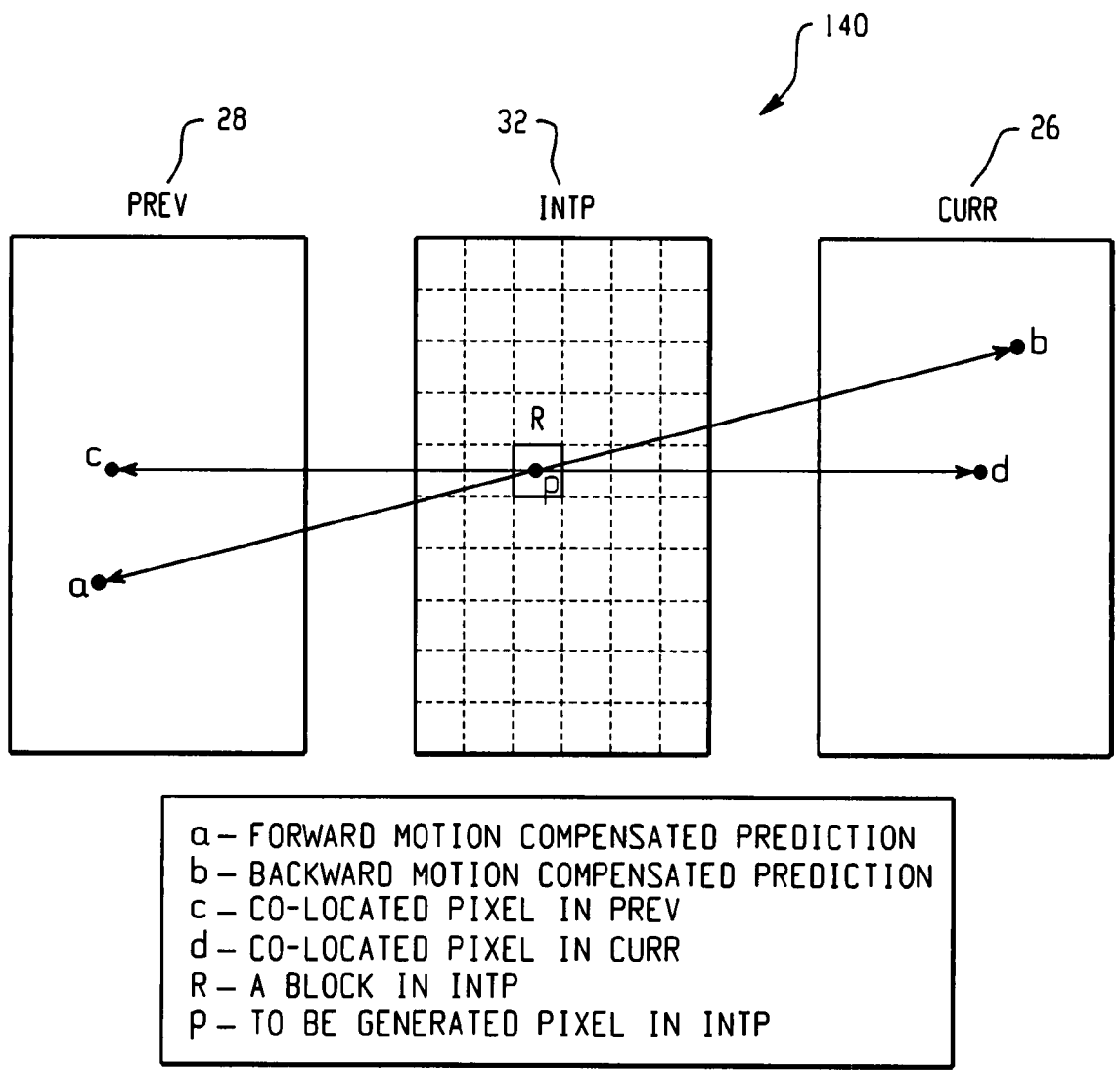
FIG. 14 is a motion trajectory diagram depicting an exemplary adaptive blending process.

FIG. 14 is a motion trajectory diagram 140 depicting an exemplary adaptive blending process. Referring to this figure, let R be an N×M block in INTP 32, with a motion vector MV, which is obtained from the ME/MVP stage 22. Now let "p" be a pixel in block R at the position (x, y). The forward motion-compensated prediction for "p" is "a" in PREV 28, and the backward motion-compensated prediction for "p" is "b" in CURR 26. Let "c" be the pixel in PREV 28 at the position (x, y), and let "d" be the pixel in CURR 26 at the position (x, y). Let mc be the average of "a" and "b", and let co be the average of "c" and "d". Then, "p" may be calculated as: $p=\lambda*co+(1-\lambda)*mc$, where $\lambda$ is the blending factor that determines the contribution amounts from the motion-compensated average and the co-located average to the final pixel value p. The blending factor $\lambda$ may change either at the block level or at the pixel level.

Figure 15:
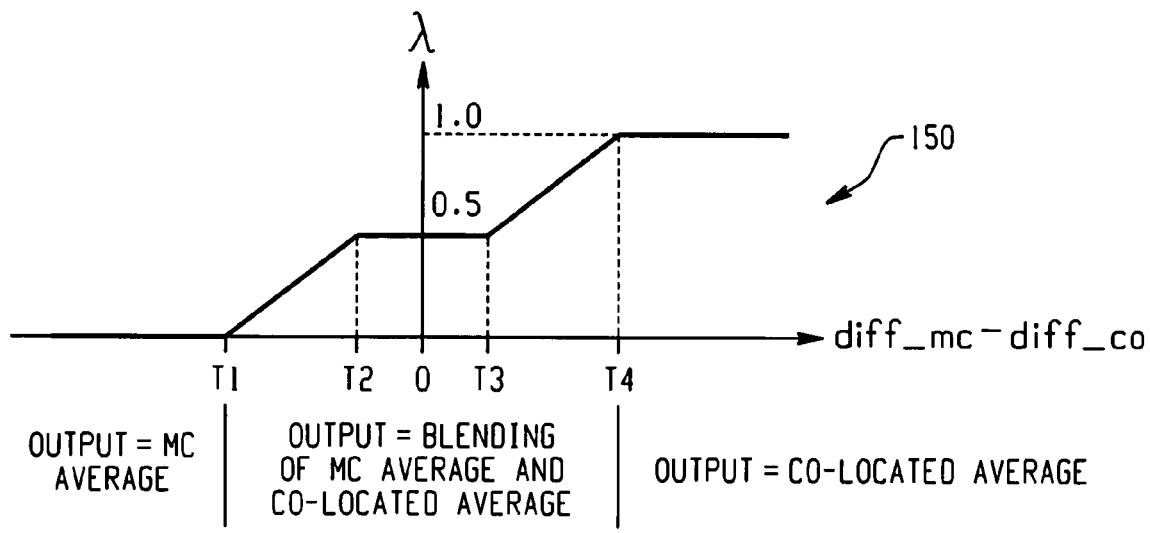
FIG. 15 is an example diagram showing the construction of a blending factor to be used in the adaptive blending process.

FIG. 15 is an example diagram 150 showing the construction of a blending factor ($\lambda$) to be used in the adaptive blending process described above. In general, $\lambda$ may depend on the likelihood of each motion trajectory involved in the blending (for example, a to b and c to d in FIG. 14) being the true motion trajectory for the pixel "p." For example, the blending factor may be determined at the pixel level in the way shown in FIG. 15. In this figure, diff_mc is a variable that measures the disparity between the motion-compensated predictions and diff_co is a variable that measures the disparity between the co-located pixels. For example, diff_mc may be given by diff_mc=|a−b|.

Alternatively, diff_mc may be measured over a window around the pixel "a" in PREV 28 and a corresponding window around the pixel "b" in CURR 26. For example, diff_mc may be calculated as the sum of absolute differences between the pixels in a 3×3 window centered at "a" in PREV 28 and the corresponding pixels in a 3×3 window centered at "b" in CURR 26. Similarly, diff_co may be given by diff_co=|c−d|. Alternatively, diff_co may be measured over a window around the pixel "c" in PREV 28 and a window around the pixel "d" in CURR 26. The parameters T1, T2, T3 and T4 shown in FIG. 15 may be programmable parameters which control the behaviors of the blending. T2−T1 and T4−T3 may be limited to be non-negative integer powers of 2 to avoid division operations.

If diff_mc is much larger than diff_co, $\lambda$ may be set to 1 so that the output pixel "p" is equal to the average of the co-located pixels. But if diff_mc is much smaller than diff_co, the blending factor $\lambda$ may be set to 0 so that the output pixel "p" is equal to the average of the motion-compensated predictions. For the cases in between these two extremes, the blending factor $\lambda$ may be chosen to favor either one or the other, depending on which disparity is larger and by how much.

Figure 16:
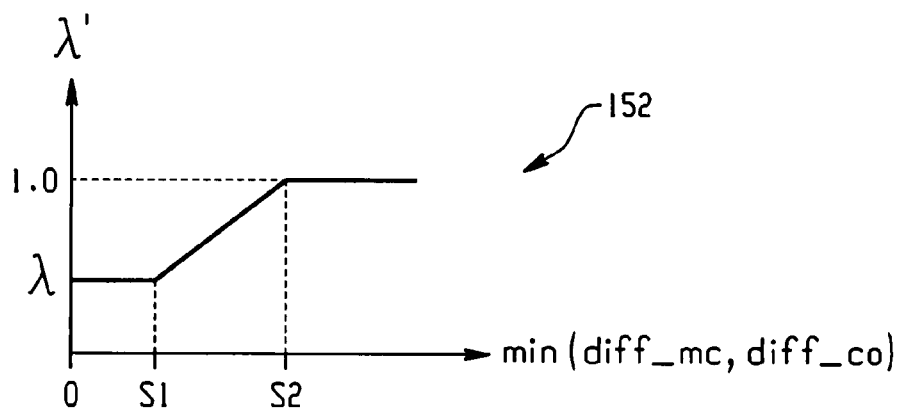
FIG. 16 is another example diagram showing the further construction of the blending factor.

FIG. 16 is another example diagram showing the further construction of the blending factor. In this additional example, the blending factor $\lambda$ from FIG. 15 may be further processed to favor more of the co-located average (co) than the motion predicted average (mc) in the case that both diff_mc and diff_co are large. This is done because in such cases (where both differential values are large) using mc may cause more noticeable artifacts than using co.

Figure 17:
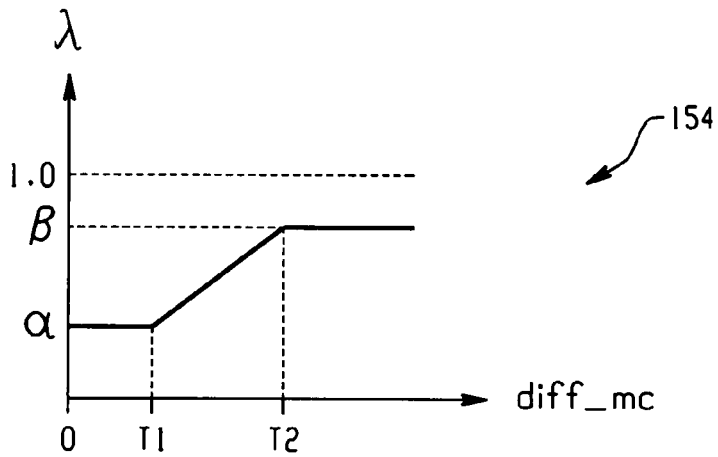
FIG. 17 is another diagram showing the construction of a blending factor to be used in the adaptive blending process.

FIG. 17 is another diagram showing the construction of a blending factor to be used in the adaptive blending process. Here, the blending factor $\lambda$ may be dependent on the motion field consistency in the neighborhood of the pixel to be interpolated. The parameters T1, T2 and the value diff_mc are defined as previously. The parameters $\alpha$ and $\beta$ satisfy the condition $0 \leq \alpha \leq \beta < 1$. In calculating the blending factor for the pixel "p" in INTP 32, the parameters T1, T2, $\alpha$ and $\beta$ may be controlled through a consistency measurement of the neighboring motion field around the pixel "p." If the neighboring motion field around the pixel "p" appears to be consistent, then the motion-compensated average may be favored over the co-located average. On the other hand, if the neighboring motion field is not consistent, then the co-located average may be favored.

Alternatively, the motion field consistency may be measured by the maximum absolute difference (MaxMvDiff) between the motion vector of the block R and the motion vectors of its neighboring blocks. MaxMvDiff may then be subject to a threshold condition to determine T1 and T2. If it is smaller than the threshold, then T1 may be set large, and thus the motion-compensated average mc is favored over the co-located average co. Otherwise, if MaxMvDiff is larger than a second threshold, then T2 may be set small, and thus the co-located average co is favored over the motion-compensated average mc. Alternatively, the parameters $\alpha$ and $\beta$ may be related to MaxMvDiff such that small values of $\alpha$ and $\beta$ are chosen for small values of MaxMvDiff and thus more contribution is from mc, and large values of $\alpha$ and $\beta$ are chosen for large values of MaxMvDiff and thus more favor is given to co.

As an example, $\beta$ can be set to 1, and $\alpha$ is then determined using a step-wise increasing function such as the one shown below:

|  |  |  |  |
|---|---|---|---|
|  | if | MaxMvDiff < w1 | $\alpha = 0.0$; |
|  | else if | MaxMvDiff < w2 | $\alpha = 0.2$; |
|  | else if | MaxMvDiff < w3 | $\alpha = 0.4$; |
| else if |  | MaxMvDiff < w4 | $\alpha = 0.6$; |
| else if |  | MaxMvDiff < w5 | $\alpha = 0.8$; |
| else |  |  | $\alpha = 1.0$; | where w1, w2, w3, w4, and w5 are thresholds satisfying $w1 \leq w2 \leq w3 \leq w4 \leq w5$.

The above process of motion-compensated interpolation (MCI) 24 may be applied to the luminance components of the video signal as well as the chrominance componenets. For some color sampling formats, such as 4:2:0 and 4:2:2, the motion vectors may have to be scaled before being applied to the chrominance samples.

Finally, in the event of a scene change between PREV 28 and CURR 26, the motion estimation system results may not be reliable, and therefore the INTP 32 frame may be set to be the same as either CURR 26 if INTP is closer to CURR temporally, or PREV 28 otherwise, via the video switch shown in FIG. 2 In addition, for video materials with black bars on their borders, the positions and sizes of the black bars may be detected, and then the pixels in the black bars in the original frames may be excluded in interpolating the pixels at non-black-bar positions in INTP 32, and vice versa.

The motion-compensated frame rate conversion system and methods described herein provide many novel attributes over other frame rate conversion techniques. For example, to obtain a reliable description of the true-motion field between two frames, a hierarchical motion estimation scheme with three stages may be employed, and each of the stages may be followed by a motion vector smoothing stage to increase the reliability of the calculated vectors. In addition, temporal correlation between consecutive motion fields and spatial correlation within a motion field may be utilized to further enhance the selection process for candidate motion vectors within the motion estimation stages. Moreover, to avoid spectacularly noticeable visual artifacts, in the final interpolation stage the motion-compensated interpolation values across multiple motion trajectories may be calculated (including the co-located interpolation between two original frames) and may then be adaptively blended.

This written description uses examples to disclose the invention, including the best mode, and also to enable a person skilled in the art to make and use the invention. The patentable scope of the invention may include other examples that occur to those skilled in the art.

It is claimed:

1. A method of converting an input video sequence at a first frame rate to an output video sequence at a second frame rate, comprising the steps of:
    obtaining a current video frame and a previous video frame from the input video sequence;
    generating a first motion field comprising a first plurality of motion vectors that predict the trajectories of blocks moving from the previous video frame to the current video frame;
    generating a second motion field from the first motion field, the second motion field comprising a second plurality of motion vectors that predict the trajectories of blocks moving between the previous video frame and an interpolated video frame and moving between the interpolated video frame and the current video frame; and
    constructing an interpolated video frame from pixel data in the current and previous video frames and from the second plurality of motion vectors;
    wherein generating the first motion field comprises the steps of:
        partitioning the current video frame into a plurality of blocks; and
        for each of the plurality of blocks in the current video frame, identifying a search area in the previous video frame, and analyzing a plurality of blocks within the search area to select a motion vector that best estimates the movement of the block in the current video frame, wherein the motion vector is selected based on i) a sum of pixel-level absolute differences between the block within the search area and the block in the current video frame, ii) a temporal bias value that represents a temporal correlation between a candidate motion vector within the search area and a previous motion field, and iii) a spatial bias value that represents a spatial correlation between a candidate motion vector within the search area and the motion vectors associated with neighboring blocks within the current video frame;
    wherein computation of the temporal bias value comprises the steps of:
        determining an activity value for the block in the current video frame;
        identifying a block in the previous video frame that is either i) co-located with the block in the current video frame, or ii) pointed to by the candidate motion vector within the search area;
        determining a difference value between the candidate motion vector within the search area and a motion vector associated with the block in the previous video frame; and
        computing the temporal bias value using the activity value and the difference value.

2. The method of claim 1, further comprising the step of: processing the first plurality of motion vectors by removing motion vectors from the first motion field that are significantly different from neighboring motion vectors within the first motion field and replacing them with motion vectors that are generated from filtering the neighboring motion vectors in the first motion field.

3. The method of claim 2, further comprising the step of: processing the second plurality of motion vectors by removing motion vectors from the second motion field that are significantly different from neighboring motion vectors within the second motion field and replacing them with motion vectors that are generated from filtering the neighboring motion vectors in the second motion field.

4. The method of claim 2, further comprising the steps of:
    for each motion vector in the first motion field, calculating a 2D median of the motion vector and its neighboring motion vectors; and
    replacing each motion vector in the first motion field with the 2D median calculation.

5. The method of claim 1, wherein the activity value for a block is defined as the summation of the absolute differences between neighboring pixels in the block in the current video frame.

6. The method of claim 1, wherein the activity value is defined as ACT, and the difference value is defined as TD, and wherein the temporal bias value is computed according to the formula:

$$\text{temporal\_bias} = \min(ACT, TD*ACT/16).$$

7. The method of claim 1, wherein the second generating step further comprises the steps of:
    partitioning an interpolated video frame into a plurality of blocks, wherein the interpolated video frame is to be constructed from the pixel data in the current and previous video frames;
    for each of the plurality of blocks in the interpolated video frame, (a) identifying a set of motion vectors in the first motion field; (b) using each of the motion vectors in the set to form a first motion compensated prediction from the previous frame for the current block in the interpolated frame, and to form a second motion compensated prediction from the current frame; and (c) selecting the motion vector that results in the best match between the first motion compensated prediction and the second motion compensated prediction that are constructed from the motion vector in (b).

8. The method of claim 1, further comprising the steps of: between the first and second generating steps, generating a third motion field comprising a third plurality of motion vectors that predict the trajectory of objects moving from the previous video frame to the current video frame;
    wherein the first motion field is generated based upon a partition of the current and previous video frames into blocks of a first size, and wherein the third motion field is generated based upon a partition of the current and previous video frames into blocks of a second size, wherein the second size is smaller than the first size.

9. A method of converting an input video sequence at a first frame rate to an output video sequence at a second frame rate, comprising the steps of:
    obtaining a current video frame and a previous video frame from the input video sequence;
    generating a first motion field comprising a first plurality of motion vectors that predict the trajectories of blocks moving from the previous video frame to the current video frame;
    generating a second motion field from the first motion field, the second motion field comprising a second plurality of motion vectors that predict the trajectories of blocks moving between the previous video frame and an interpolated video frame and moving between the interpolated video frame and the current video frame; and constructing an interpolated video frame from pixel data in the current and previous video frames and from the second plurality of motion vectors.

wherein generating the first motion field comprises the steps of:

partitioning the current video frame into a plurality of blocks; and for each of the plurality of blocks in the current video frame, identifying a search area in the previous video frame, and analyzing a plurality of blocks within the search area to select a motion vector that best estimates the movement of the block in the current video frame, wherein the motion vector is selected based on i) a sum of pixel-level absolute differences between the block within the search area and the block in the current video frame, ii) a temporal bias value that represents a temporal correlation between a candidate motion vector within the search area and a previous motion field, and iii) a spatial bias value that represents a spatial correlation between a candidate motion vector within the search area and the motion vectors associated with neighboring blocks within the current video frame;

wherein the spatial bias value is computed according to the following steps:

determining an activity value for the block in the current video frame;

calculating the 2D median of the motion vectors for the neighboring blocks to the block in the current video frame;

determining a difference value between the candidate motion vector within the search area and the 2D median of the motion vectors for the neighboring blocks; and computing the spatial bias value using the activity value and the difference value.

10. The method of claim 9, wherein the activity value is defined as ACT, and the difference value is defined as SD, and wherein the spatial bias value is computed according to the formula:

$$spatial\_bias=min(ACT/2, SD*ACT/32).$$

11. A method of converting an input video sequence at a first frame rate to an output video sequence at a second frame rate, comprising the steps of:

obtaining a current video frame and a previous video frame from the input video sequence;

generating a first motion field comprising a first plurality of motion vectors that predict the trajectories of blocks moving from the previous video frame to the current video frame;

generating a second motion field from the first motion field, the second motion field comprising a second plurality of motion vectors that predict the trajectories of blocks moving between the previous video frame and an interpolated video frame and moving between the interpolated video frame and the current video frame; and constructing an interpolated video frame from pixel data in the current and previous video frames and from the second plurality of motion vectors, wherein construction of the interpolated video frame comprises the steps of:

generating a motion compensated average prediction of the pixel value for each block in the interpolated video frame based on the second plurality of motion vectors and the pixel values of the previous and current frames;

generating a temporal average prediction of the pixel value for each block in the interpolated video frame based on the pixel values of co-located pixels in the current and previous video frames; and adaptively blending the motion compensated average prediction and temporal average prediction to form a final pixel value for each pixel in the interpolated video frame, wherein the adaptive blending favors either the motion compensated average prediction or the temporal average prediction using a blending factor;

wherein the motion compensated average prediction is denoted (mc) and the temporal average prediction is denoted (co), and wherein the adaptively blending step forms the final pixel value (p) in the interpolated video frame according to the following formula:

$$p=*co+(1-\lambda),$$

wherein $\lambda$ is the blending factor.

12. The method of claim 11, wherein the blending factor is computed at either a block level or at a pixel level.

13. The method of claim 11, wherein the blending factor is determined as a function of the difference between pixels in the current and previous frames associated with the motion compensated prediction, denoted (diff_mc), and as a function of the difference between the pixels in the current and previous frames associated with the temporal average prediction, denoted (diff_co).

14. The method of claim 13, wherein if diff_mc is substantially larger than diff_co, then the blending factor $\lambda$ is set to about 1, and wherein if diff_co is substantially larger than diff_mc, then the blending factor $\lambda$ is set to about 0.

15. The method of claim 13, wherein the blending factor $\lambda$ is set to a value between 0 and 1 as a function of diff_mc and diff_co.

16. A method of generating an interpolated video frame between a current frame and a previous frame in an input video sequence, comprising the steps of:

estimating the movement of objects between the previous video frame and the current video frame and generating a motion field comprising a plurality of motion vectors;

generating a motion compensated average prediction of the pixel value for each block in the interpolated video frame based on the plurality of motion vectors and the pixel values of the previous and current frames;

generating a temporal average prediction of the pixel value for each block in the interpolated video frame based on the pixel values of co-located pixels in the current and previous video frames; and adaptively blending the motion compensated average prediction and the temporal average prediction to form a final pixel value for each pixel in the interpolated video frame, wherein the adaptive blending favors either the motion compensated average prediction or the temporal average prediction using a blending factor;

wherein the motion compensated average prediction is denoted (mc) and the temporal average prediction is denoted (co), and wherein the adaptively blending step forms the final pixel value (p) in the interpolated video frame according to the following formula:

$$p=*co+(1-\lambda),$$

wherein $\lambda$ is the blending factor.

17. The method of claim 16, wherein the blending factor is computed at either a block level or at a pixel level.

18. The method of claim 16, wherein the blending factor is determined as a function of the difference between pixels in the current and previous frames associated with the motion compensated prediction, denoted (diff_mc), and as a function of the difference between the pixels in the current and previous frames associated with the temporal average prediction, denoted (diff_co).

19. The method of claim 18, wherein if diff_mc is substantially larger than diff_co, then the blending factor $\lambda$ is set to about 1, and wherein if diff_co is substantially larger than diff_mc, then the blending factor $\lambda$ is set to about 0.

20. The method of claim 18, wherein the blending factor $\lambda$ is set to a value between 0 and 1 as a function of diff_mc and diff_co.

21. A method of estimating the movement of objects in an input video sequence, comprising the steps of:
obtaining a previous video frame and a current video frame from the input video sequence;
partitioning the current video frame into a plurality of blocks;
generating a motion field comprising a plurality of motion vectors that estimate the movement of blocks from the previous video frame to the current video frame, further comprising the steps of:
for each of the plurality of blocks in the current video frame, identifying a search area in the previous video frame, and analyzing a plurality of blocks within the search area to select a motion vector that best estimates the movement of the block;
wherein the selecting step is based on a sum of i) pixel-level absolute differences between the block within the search area and the block in the current video frame, ii) a temporal bias value that represents a temporal correlation between a candidate motion vector within the search area and a previous motion field, and iii) a spatial bias value that represents a spatial correlation between a candidate motion vector within the search range and the motion vectors associated with neighboring blocks within the current video frame;
wherein computation of the spatial bias value comprises the steps of:
determining an activity value for the block in the current video frame;
calculating the 2D median of the motion vectors for the neighboring blocks to the block in the current video frame;
determining a difference value between the candidate motion vector within the search area and the 2D median of the motion vectors for the neighboring blocks; and
computing the spatial bias value using the activity value and the difference value.

22. The method of claim 21, wherein the activity value is defined as ACT, and the difference value is defined as SD, and wherein the spatial bias value is computed according to the formula:

spatial_bias=min($ACT/2, SD*ACT/32$).

23. A method of estimating the movement of objects in an input video sequence, comprising the steps of:
obtaining a previous video frame and a current video frame from the input video sequence;
partitioning the current video frame into a plurality of blocks;
generating a motion field comprising a plurality of motion vectors that estimate the movement of blocks from the previous video frame to the current video frame, further comprising the steps of:
for each of the plurality of blocks in the current video frame, identifying a search area in the previous video frame, and analyzing a plurality of blocks within the search area to select a motion vector that best estimates the movement of the block;
wherein the selecting step is based on a sum of i) pixel-level absolute differences between the block within the search area and the block in the current video frame, ii) a temporal bias value that represents a temporal correlation between a candidate motion vector within the search area and a previous motion field, and iii) a spatial bias value that represents a spatial correlation between a candidate motion vector within the search range and the motion vectors associated with neighboring blocks within the current video frame;
wherein the temporal bias value is computed according to the following steps:
determining an activity value for the block in the current video frame, wherein the activity value for a block is defined as the summation of the absolute differences between neighboring pixels in the block in the current video frame;
identifying a block in the previous video frame that is either i) co-located with the block in the current video frame, or ii) pointed to by the candidate motion vector within the search area;
determining a difference value between the candidate motion vector within the search area and a motion vector associated with the block in the previous video frame; and
computing the temporal bias value using the activity value and the difference value.

24. The method of claim 23, wherein the activity value is defined as ACT, and the difference value is defined as TD, and wherein the temporal bias value is computed according to the formula:

temporal_bias=min($ACT, TD*ACT/16$).

* * * * *